United States Patent [19]

Sparling et al.

[11] Patent Number: 4,681,499

[45] Date of Patent: Jul. 21, 1987

[54] CONTROLLED EXPANSION PROTRUDING-HEAD RIVET DESIGN AND METHOD OF INSTALLING SAME

[75] Inventors: Kenneth P. Sparling, Burbank; Angelo Incardona, Researda; Garth D. Kikendall, Glendale; David G. Richardson, Burbank; Ronald E. Wood, Sepulveda; Leon Bakow, Sherman Oaks, all of Calif.

[73] Assignee: Lockheed Corporation, Calabasas, Calif.

[21] Appl. No.: 657,700

[22] Filed: Oct. 4, 1984

[51] Int. Cl.$^4$ ............................................. F16B 19/06
[52] U.S. Cl. ..................................... 411/507; 411/506
[58] Field of Search ............... 411/506, 500, 501, 502, 411/503, 504, 505, 507

[56] References Cited

U.S. PATENT DOCUMENTS

| 221,447 | 11/1979 | Cornell | 35/37 |
| 1,966,401 | 7/1934 | Andren | 35/35 |
| 3,561,102 | 2/1971 | Diemer | 29/509 |
| 3,747,467 | 7/1973 | Rosman | 411/504 X |
| 3,821,871 | 7/1974 | Schmitt | 52/758 |
| 4,004,484 | 1/1977 | Speakman | 411/507 |
| 4,230,016 | 10/1980 | Merrell | 85/9 R |

FOREIGN PATENT DOCUMENTS 163860 5/1980 Netherlands ..................... 411/507

OTHER PUBLICATIONS

"The Real Strength of Rivets", *Fasteners*, Winter, 1962/63.

Primary Examiner—Gary L. Smith
Assistant Examiner—Adrian H. Whitcomb, Jr.
Attorney, Agent, or Firm—Louis L. Dachs

[57] ABSTRACT

The invention is a protruding-head rivet for joining two or more structural elements together which, when driven, using all standard driving tools, provide a controlled expansion of the hole. The protruding-head rivet 10 has a shank 12 having a nominal diameter 18. The head diameter 24 is between 1.642 times the minimum shank diameter 18 and 1.706 times the maximum shank diameter. The head has a center spherical radius 26 of between 1.320 times the minimum shank diameter and 1.406 times the maximum shank diameter and a head outer spherical radius 30 of between 0.321 times the minimum shank diameter 18 and 0.353 times the maximum shank diameter. The underhead surface downward directed angle 36 is between 5 and 6 degrees. The head height 22 is between 0.455 times the minimum shank diameter 18 and 0.479 times the maximum shank diameter.

The radius 38 between the protruding head and the shank is between 0.050 times the minimum shank diameter and 0.100 times the maximum shank diameter and the shank's tail end has a spherical radius which is between 0.365 times the minimum shank diameter 18 and 0.307 times the maximum shank diameter and tangent thereto when perpendicular to the longitudinal axis 11 of shank rivet located by a dimension 44 from the end of the shank 12 of between 0.312 times the minimum shank diameter 18 and 0.255 times the maximum shank diameter.

4 Claims, 7 Drawing Figures

CONTROLLED EXPANSION PROTRUDING-HEAD RIVET DESIGN AND METHOD OF INSTALLING SAME

TECHNICAL FIELD

The invention relates to the field of fasteners and, in particular, a protruding-head rivet design which provides controlled expansion of the hole when driven, increasing the fatigue life of the structure being joined.

BACKGROUND INFORMATION

Rivets are probably the oldest and most widely used fasteners in the industry. They are inexpensive to manufacture, do not require close tolerance holes, and they are easily installed. Riveted structures usually have an extended service (fatigue) life because of the hole-filling characteristics of the rivet. When rivets are driven, the rivet shank expands and tends to fill the hole. This eliminates relative movement between the joined structural members, thus, providing the extended fatigue life.

Pins installed with an interference fit, which puts residual hoop tension stresses around the hole, are used to enhance the fatigue life of structures. These pins are expensive and require very close tolerance holes and, therefore, are expensive to install. One such fastener is the Hi-Tigue pin, manufactured by the Hi-Shear Corporation, Torrance, Calif.

It would be more desirable to place residual hoop compression stresses around the hole. One technique to accomplish this, which has been developed by the Fatigue Technology Corporation, Seattle, Wash., is to expand the hole with a removable sleeve and mandrel. The mandrel, while it is being pulled through the hole, stresses the material around the hole beyond the proportional limit in hoop tension. Thus, when the mandrel is removed, the material around the hole recovers elastically and forms residual hoop compression locally around the hole.

To obtain better control of the filling of the hole when driving, various rivet designs have been proposed and developed. For example, U.S. Pat. No. 1,966,401, "Rivet" by B. T. Andren. Andren discloses a protruding-head rivet wherein the underside of the head is tapered downward. Thus, when the rivet is driven, initially the material in the head will meet little resistance when flowing into the shank portion within the hole. Thereafter, the underside of the head becomes flattened and comes into contact with the material being joined and, thus, distributes driving loads uniformly into the structure. In this design there is no relationship between the taper angle and head shape or height so as to provide a "controlled" expansion of the rivet shank within the hole. Thus, there is a significant possibility of not filling the hole or overexpanding it and, additionally, trapping of sealant, if used, when the rivets are driven. Therefore, the relationship between the material in the head, the shape of the standard protruding-head rivet set, the degree of undercut of the head, and the head-to-shank radius are critical and must be tightly controlled.

Of additional interest in U.S. Pat. No. 3,561,102, "Process of Forming a Cold Driven Riveted Joint" by J. A. Diemer. Diemer discloses a protruding-head rivet having a circular head flattened at the top. In addition, the transition between the shank and the head is conical in shape and connects to the head in a large radius. While this design appears to be attempting to control expansion of the shank portion in the hole, specialized tooling is required for driving the rivet, which is a decided disadvantage.

In none of the above rivets has an attempt been made to make all critical dimensions of the head and tail, before and after driving of the rivet, a function of the shank diameter. While in most cases standard rivet sizes will suffice, there are instances where special diameters (switching from inch to metric sizes, etc.) are required. Thus, a rivet having all the critical dimensions based on the shank diameter would be advantageous, since design and test time required to insure necessary static tension, shear strength, and fatigue life would be reduced to a minimum.

Material selection for rivets is also a critical problem. If the material has a high-yield stress, difficulty if encountered when driving because of a tendency of the bucked tail portion of the rivet to crack and fatigue life will be decreased because of lack of hole filling. If the rivet material is too malleable, the rivet may not have sufficient strength. So the selection of material properties becomes a trade-off.

One of the ways around this problem has been the use of the 2024-T4 aluminum alloy "icebox" rivet material which, when solution heat-treated, quenched, and stored at a temperature below zero degrees Fahrenheit, remains in a relatively soft condition. Upon return to room temperature, this aluminum alloy rivet must be driven within 15 minutes since it quickly age hardens. Thus, the name "ice box" rivet. While this rivet is widely used, it is expensive to handle. If prematurely brought to room temperature, it cannot be driven without cracking the bucked tail. Rivets inadvertently allowed to harden prior to driving must be reheat-treated. Therefore, from the time of removal from the refrigerator and transport to the assembly station, the rivets are carried and stored in a container filled with dry ice. It is inevitable that some rivets will be driven after they are too hard; thus, they crack and must be drilled out and replaced. The added expense is obvious. Therefore, a considerable cost savings can be achieved, particularly in the manufacture of aircraft, if a non-icebox material that provides the same static strength and fatigue life as the icebox rivet can be obtained.

Additional patents of interest are as follows: U.S. Pat. No. 221,447, "Rivet" by J. B. Cornell; U.S. Pat. No. 3,821,871, "Fatigue Resistant Fasteners" by H. A. Schmitt, and U.S. Pat. No. 4,230,016, "Fatigue Resistant Fasteners and Method of Manufacturing Joints Therewith" by H. B. Merrell.

Therefore it is a primary object to provide a rivet that, when driven, obtains controlled expansion of the hole, placing residual hoop compression stresses in the hole wall and thereby increasing the fatigue life.

It is another primary object of the subject invention to provide a rivet wherein all critical dimensions thereof are ratios of the shank diameter.

Another primary object of the subject invention is to provide a 7050 aluminum alloy rivet that can be used directly as a substitute for the 2024 aluminum alloy icebox rivet.

A further object of the subject invention is to produce a rivet that can be installed and driven in holes produced with standard twist drills.

A still further object of the subject invention is to provide a protruding-head rivet that has a significantly lower-weight head than the Military Standard MS20470 protruding-head rivet while maintaining the same tension and shear strength for a given material.

Another object of the subject invention is to provide a rivet that can be installed and driven with or without tank sealant or primer.

An additional object of the subject invention is to provide a rivet that can be driven with all standard protruding-head driving tools, whether hand bucked, squeezed, or automatically installed.

DISCLOSURE OF INVENTION

The invention is a protruding-head rivet for joining two or more structural elements together which, during driving, provides a controlled expansion of the hole and, after driving, leaves residual hoop compression around the hole. The protruding-head rivet has a shank having a nominal diameter (the diameter in the middle of the tolerance range). Thus, the minimum shank diameter at the smallest allowable diameter and the maximum diameter is the maximum allowable shank diameter within the tolerance range. The head diameter is between 1.642 times the minimum shank diameter and 1.706 times the maximum shank diameter. The center of the head has a spherical radius of between 1.320 times the minimum shank diameter and 1.406 times the maximum shank diameter. The rivet has an outer-head spherical radius of between 0.321 times the minimum shank diameter and 0.353 times the maximum shank diameter and which blends into the center spherical radius. This radius is measured from the intersection of the protruding-head and shank. An underface head angle between 5 and 6 degrees downward from the intersection of the the head and shank is used. The head height is between 0.455 times the minimum shank diameter and 0.479 times the maximum shank diameter measured from the intersection of the shank and head.

The radius between the protruding-head and shank is between 0.050 times the minimum shank diameter and 0.100 times the maximum shank diameter and the shank's opposite end or tail has a spherical radius which is between 0.365 times the minimum shank diameter and 0.307 times the maximum shank diameter and is tangent thereto when perpendicular to the longitudinal axis thereto and located by a distance between 0.312 times the minimum shank diameter and 0.255 times the maximum shank diameter from the end of the shank.

The novel features which are believed to be characteristic to the invention, both as to its organization and method of operation, together with further objects and advantages thereof, will be better understood from the following description connected with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side view of the protruding-head rivet.

Illustrated in FIG. 2 is a cross-sectional view of the undriven rivet installed in a structure.

Figure 3:
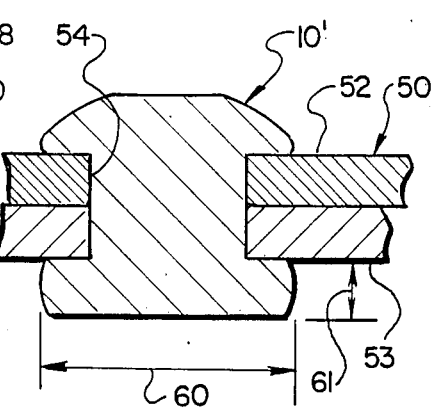

Illustrated in FIG. 3 is a cross-sectional view of the protruding-head rivet installed in a structure and driven.

Figure 4:
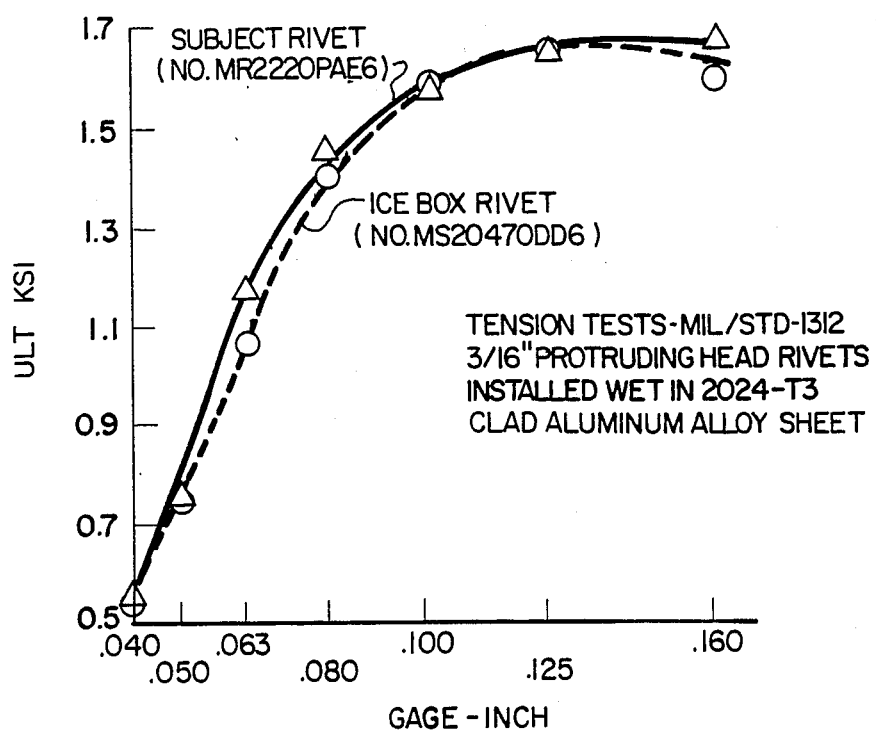

Illustrated in FIG. 4 is a graph of static tension test of the subject rivet made of 7050-T73 aluminum alloy compared to the standard icebox rivet.

Figure 5:
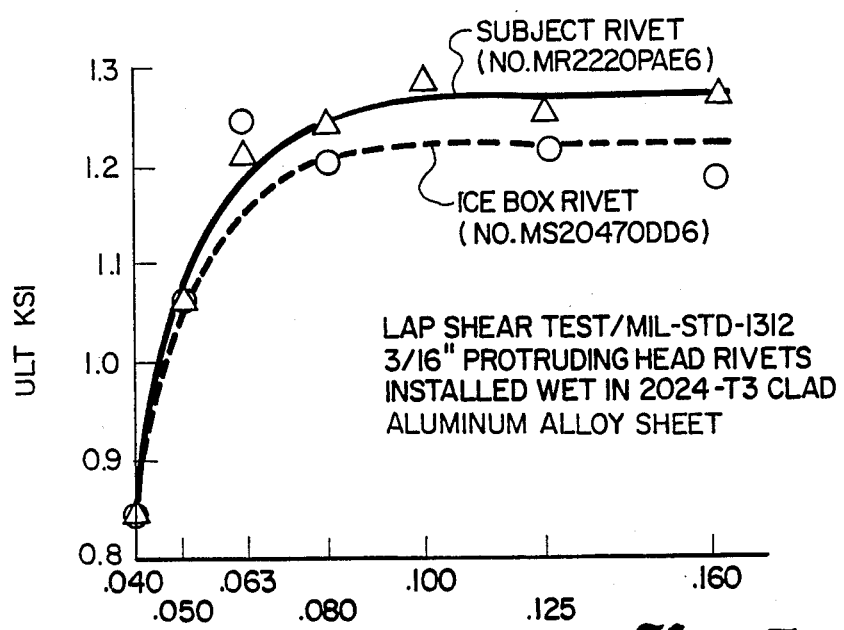

Illustrated in FIG. 5 is a graph of static lap shear tests of the subject rivet made of 7050-T73 aluminum alloy compared to the standard icebox rivet.

Figure 6:
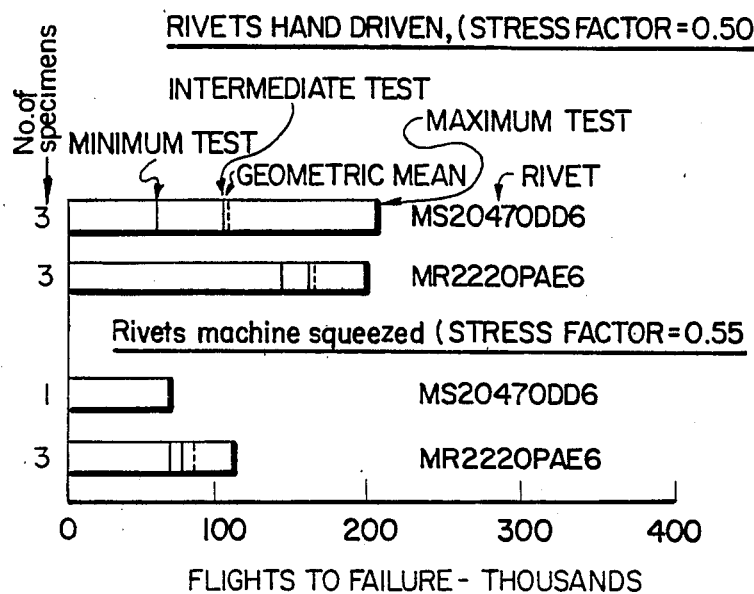

Illustrated in FIG. 6 is a bar chart of fatigue test results of the subject rivet made of 7050-T73 aluminum alloy compared to the standard icebox rivet.

Figure 7:
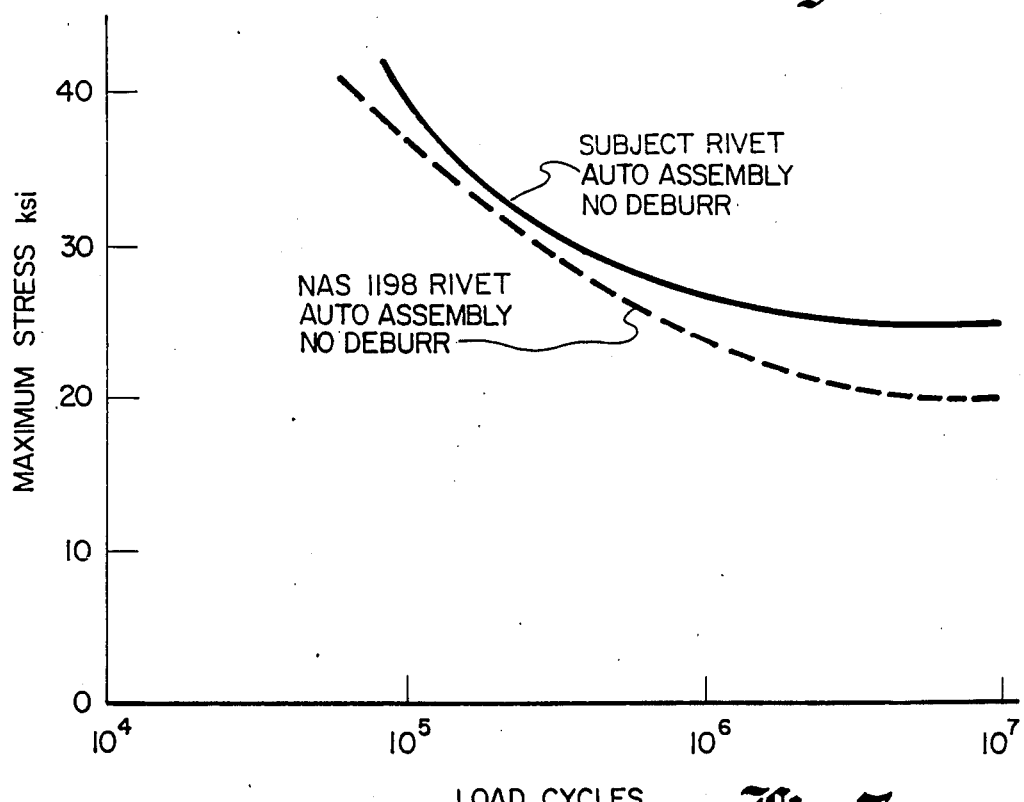

Illustrated in FIG. 7 is a graph of the fatigue test results of the subject rivet design made of A286 steel compared to a NAS standard rivet made from the same material.

BEST MODE FOR CARRYING OUT THE INVENTION

Figure 1:
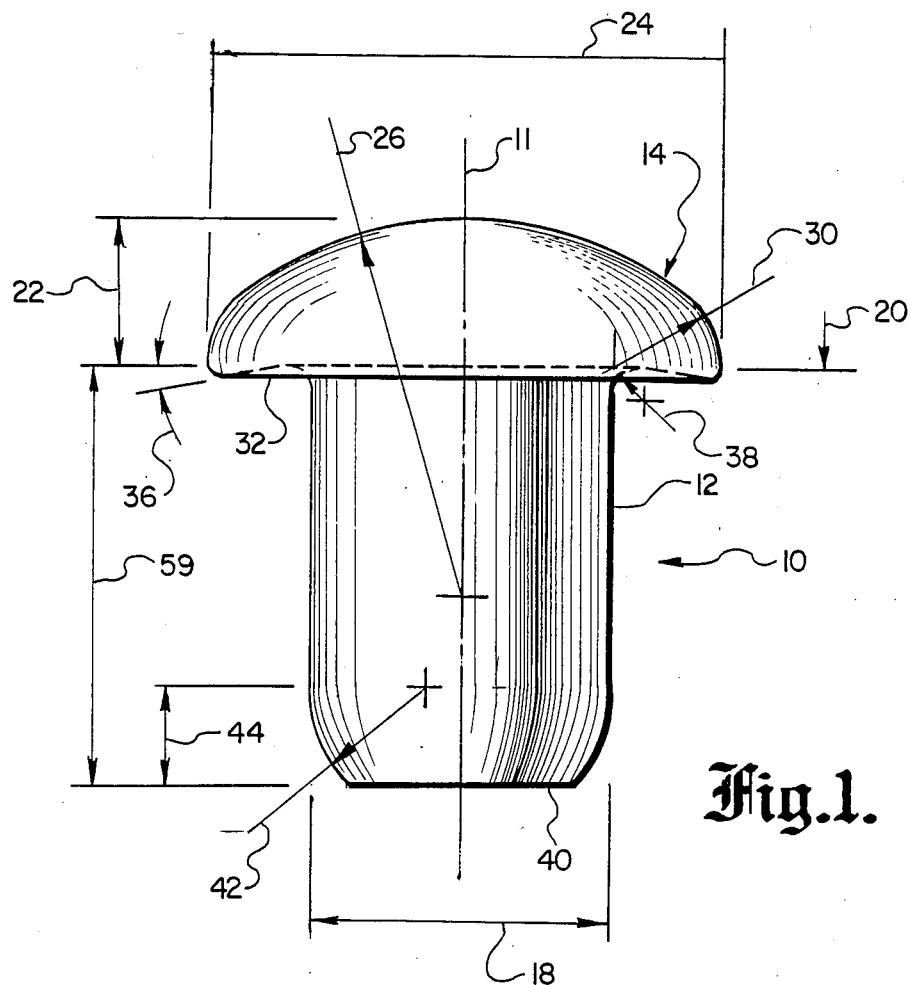

Referring to FIG. 1, it can be seen that the rivet, generally designated by numeral 10, has a longitudinal axis 11 with a shank portion 12 and a protruding-head portion 14. The shank portion 12 has a diameter, indicated by numeral 18 with a minimum and maximum value. (The nominal diameter is the diameter in the middle of the tolerance range.)

The plane formed by the intersection of the shank 12 with the protruding head 14 is indicated by numeral 20. The height 22 of the protruding head 14, measured from the plane 20, is 0.455 times the minimum shank diameter and 0.479 times the maximum shank diameter. The diameter 24 of the protruding head 14 is between 1.642 times the minimum shank diameter and 1.706 times the maximum shank diameter. The center spherical radius of the protruding head 14, indicated by numeral 26, is between 1.320 times the minimum shank diameter and 1.406 times the maximum shank diameter. The outer spherical radius, indicated by numeral 30, has as its center the intersection of the plane 20 and the shank diameter 18. This outer radius 30 is blended into the center radius 26.

The underhead surface 32 of the protruding head 14 has a downward directed angle 36 from the plane 20 of between 5 and 6 degrees. The vertex of this angle is again the intersection of the shank 12 and the protruding head 14. The radius 38 is between 0.050 and 0.100 of the shank diameter.

The end portion or tail 40 of the shank 12 includes a radius 42 which is between 0.365 times the minimum shank diameter 18 and 0.307 times the maximum shank diameter and tangent to the shank diameter when perpendicular thereto. The center of the radius 42 is located by dimension 44 which is between 0.312 times the minimum shank diameter 18 and 0.255 times the maximum shank diameter from the end of the shank.

Figure 2:
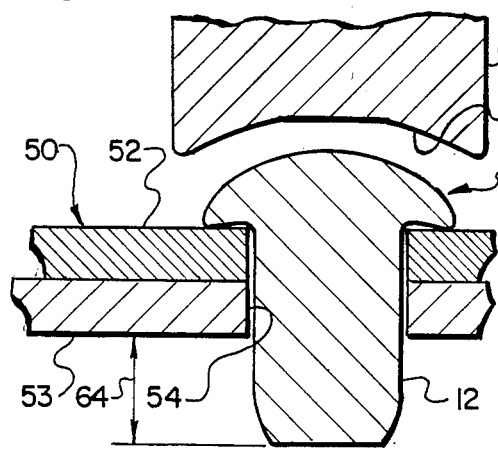

Illustrated in FIG. 2 is a structure 50 comprising plates 52 and 53 having a hole 54 drilled therethrough. The rivet 10 is shown installed in the hole 54 prior to driving. The hole 54 should have a minimum diameter slightly less than the minimum drill diameter. A "line-to-line" fit, where the maximum shank diameter equals the minimum hole diameter, is ideal. The maximum hole diameter is 1.05 times the minimum shank diameter 18.

The rivet 10 is driven by conventional driving equipment such as driver 56 used in conjunction with a bucking bar (not shown). The conventional driver 56 has an anvil 58 that has a radius that is slightly larger than the radius of conventional rivets, such as MS20470DD types, and is flattened in the middle. The width of the flat is approximately 55% of the nominal shank diameter, with the adjacent radius tangent to the flat.

Illustrated in FIG. 3 is the rivet, designated by numeral 10', installed and driven in the structure 50. When properly driven it will expand the hole 54, putting residual compression stresses in the hole wall and thereby greatly improving the fatigue life of the joined structure 50. The superior static shear, tension strengths, and fatigue performance can be obtained when the grip or thickness of parts to be joined is less than 2.5 times the shank diameter.

Referring to FIGS. 1-3, the length 59 of the shank 12 must be selected so that the after-driving tail diameter 60 and tail 61 (FIG. 3) falls between (1) a tail diameter 60 equal to a minimum of 1.45 times the nominal shank diameter, and a tail height 61 to a maximum of 0.60 times the nominal shank diameter, and (2) a diameter 60 equal to a maximum of 1.75 times the nominal shank diameter and a tail height 61 to a minimum of 0.40 times the nominal shank diameter. The above after-driving dimensions can be obtained if the length 59 of the rivet is selected such that the length 64 extending out of the hole 54 prior to driving is 1.1 to 1.3 times the nominal diameter of the shank diameter 18.

One of the primary advantages of this protruding-head rivet design is that it can be used to directly replace Military Standard icebox rivets, i.e., MS20470DD. One of the best "non-icebox' material is 7050 aluminum alloy, heat-treated and artificially aged to the T73 condition; however, even in an optimum heat-treat, it can not be substituted for the icebox rivet using the MS20470DD configuration. With this new rivet design, the 7050 alloy performs equal to or better than the Military Standard icebox rivet. Using the following heat-treat schedule, even better performance is obtained: Solution heat-treat is 890°±10° F. for 30 to 60 minutes followed by a cold-water quench at 100° F. maximum. Thereafter, an artificial-aging treatment is performed, consisting of 250°±5° F. for 8-10 hours followed by an exposure to 355°±5° F. for 12-14 hours.

TEST RESULTS

Static tension specimens were fabricated with both 2024-T3 and 7075-T6 clad aluminum sheet in eight different gauge combinations. Three specimens were fabricated for each condition with one half machine installed and the other half using hand-held rivet guns. The subject rivet (No. MR2220PAE6) was compared directly to current tests of the icebox rivet (No. MS20470DD6). These tests demonstrated that the subject rivets were essentially equivalent to the icebox rivets as evidenced by the graph in FIG. 4.

Static lap-shear specimens were prepared from 2024-T3 and 7075-T6 clad aluminum sheet in eight different gauge combinations using hand-held rivet guns and machine installed techniques. They were then tested in accordance with Military Standard 1312. The subject rivets, (No. MR2220PAE6) protruding-head rivets, were compared with icebox rivets (MS20470DD6). The subject rivets produced results at least as good as those for the icebox rivet specimens. A graph of the test results for the 3/16 inch diameter rivets in 2024-T3 clad aluminum alloy sheet is shown in FIG. 5.

Both constant amplitude and spectrum lap-shear fatigue tests of hand-driven and machine-squeezed rivets installed in 7075-T6 aluminum alloy sheet joints were run. Illustrated, particularly in FIG. 6, is a graph of spectrum fatigue test results. A higher stress factor was used for testing the machine-squeezed rivet specimens to shorten the test lives. This fatigue test program demonstrated that the subject rivet (MR2220PAE) is an excellent replacement for the icebox rivet (MS20470DD).

It should be noted that while these tests were directed at a replacement of a specific alloy rivet (icebox) with a 7050 aluminum alloy material, the rivet design does provide greater fatigue life over other existing military specification rivets regardless of rivet material.

For example, illustrated in FIG. 7 is a graph of fatigue tests of A286 steel rivets made in accordance to the teachings herein installed in Ti-6A1-4V annealed sheets. It can be seen that the subject rivet offers a considerable increase in fatigue life over NAS1198-style rivets made from the same material (in this case a 5/32 diameter 5/16 inch grip rivet).

The increased performance of this rivet design when using standard driving tools is believed primarily due to the combination of: (1) the dual radius head with increased head height prior to driving allows a smaller overall head diameter, which provides more metal flow into the shank when driving, and (2) the downward angled underside of the protruding head, which allows a significant amount of material to flow into the shank during driving, causing the diameter thereof to expand and put hoop tension stresses into the hole wall. When the proper amount of material from the head and tail has flowed into the shank, the underside of the protruding head bottoms out, the hoop tension stress buildup around the hole stops beyond the proportional limit, at a point less than the 0.2% yield stress of the material being joined, and additional driving forces then flows primarily through the joined plates. The bucked tail has started to form at this time. When the driving force is removed, elastic recovery causes residual hoop compression stresses to form around the rivet.

The rivet head and tail are sized so that the volume of rivet material is sufficient to put the material being joined, around the hole, into the plastic range; however, the volume is limited so that, using the standard protruding-head rivet sets and bars, it is not possible to "drive" too much rivet material into the hole.

While the protruding-head rivet has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

This protruding-head rivet is useful for joining structures together and, in particular, aircraft structures.

What is claimed is:

1. A protruding-head rivet for joining two or more structural elements together, the rivet having a shank portion with a minimum and maximum diameter, the rivet providing a controlled expansion of the hole when the hole has a minimum diameter equal to the maximum shank diameter and a maximum diameter 1.05 times the minimum shank diameter, the rivet comprising:
    a protruding-head portion having the following dimensions:
        a head diameter of between 1.642 times the minimum shank diameter and 1.706 times the maximum shank diameter;
        a center-head spherical radius of between 1.320 times the minimum shank diameter and 1.406 times the maximum shank diameter;

a spherical outer-head radius of between 0.321 times the minimum shank diameter and 0.353 times the maximum shank diameter, said spherical outer radius blending with said center head spherical radius;

a head height of between 0.455 times the minimum shank diameter and 0.479 times the maximum shank diameter; and an underhead downward angle of between 5 and 6 degrees measured from the intersection of said shank and said head.

2. The rivet as set forth in claim 1 wherein:

the radius between said protruding head and said shank is between 0.050 times the minimum shank diameter and 0.100 times the maximum shank diameter;

said shank's tail end has a spherical radius which is between 0.365 times the minimum shank diameter and 0.307 times the maximum shank diameter and tangent thereto when perpendicular to the longitudinal axis of said shank diameter located from the end of said shank by a distance between 0.312 times the minimum shank diameter and 0.255 times the maximum shank diameter.

3. A rivet as set forth in claim 2 wherein said rivet is made of 7050T73 aluminum alloy.

4. A rivet as set forth in claim 3 wherein said rivet is heat-treated to the following schedule:

a solution heat-treat to 890°±10° F. for 30 to 60 minutes;

a cold-water quench at 100° F. maximum; and an artificial aging at 250°±5° F. for 8 to 10 hours followed by exposure to 355°±5° F. for 12 to 14 hours.

* * * * *